June 8, 1965 A. E. SNOWDON 3,188,589

ELECTRICAL COMMUTATING SURFACE

Filed March 20, 1961

INVENTOR.
Arthur E. Snowdon
BY
Johnson and Kline
ATTORNEYS

United States Patent Office 3,188,589

Patented June 8, 1965

3,188,589

ELECTRICAL COMMUTATING SURFACE

Arthur E. Snowdon, Bristol, Conn., assignor to The Superior Electric Company, Bristol, Conn., a corporation of Connecticut Filed Mar. 20, 1961, Ser. No. 97,076

2 Claims. (Cl. 336—149)

The present invention relates to an electrical commutating surface and more particularly to coating on a copper wire electricity conductor, a metal that forms a smooth surface that is exceedingly corrosion resistant, wear resistant and has a stabilized contact resistance with another electrical conductor in contacting electrical engagement therewith.

Particular utility of the present invention is in electrical apparatus having a carbon or graphitic brush that engages copper wire to transfer electricity between the brush and the wire. A specific apparatus, as hereinafter set forth in which the present invention is exceedingly advantageous, is an adjustable voltage autotransformer of the type having a plurality of turns of an electrical conducting wire wound on a paramagnetic core with the outer layer of turns having exposed portions that form a commutating surface. A carbon brush rides in contact with the exposed portions to provide electrical conduction between one or more of the wire turns and the brush. The wire is generally round in cross-section and has a thin covering of dielectric material adhered thereto such that when a chordal segment of the wire and its insulation is removed to form an exposed commutating portion for each outer turn, a substantially flat commutating surface or brush track is formed.

A wire is formed of copper and, if exposed as it must be to form a commutating surface, under some conditions, such as industrial atmospheres, long use at constant setting etc., the copper surface deteriorates by oxidation and/or corrosion thereby altering the set conditions and increasing the probability of malfunctioning. Thus copper per se is prevented from forming a completely satisfactory commutating surface. While it has been proposed to cover or plate these exposed copper portions with a more corrosion resistant metal such metals, while an improvement over bare copper, have not been completely satisfactory. Thus, for example, a rhodium plating is deleteriously affected by a humid salt atmosphere while a silver plating is affected by sulphur vapors.

It is accordingly an object of the present invention to provide a coating for an exposed copper conducting wire which provides an exceptionally smooth surface that is substantially corrosion resistant.

Another object of the present invention is to provide a coating of an exposed portion of a copper conductor with a plating material which achieves the above object and which provides a constant and proper contact resistance with a carbon brush in engagement therewith.

A further object of the present invention is to provide a coating of a material that may be directly secured to the copper surface or if desired, a base plate of a different material may be used with the brush engaging coating being secured onto the base plate.

In carrying out the present invention the plating material which is secured onto the exposed portion of the copper conductor which is contacted by a commutating device, such as a carbon brush, is ruthenium.

Other features and advantages will hereinafter appear.

Figures 1, 2:
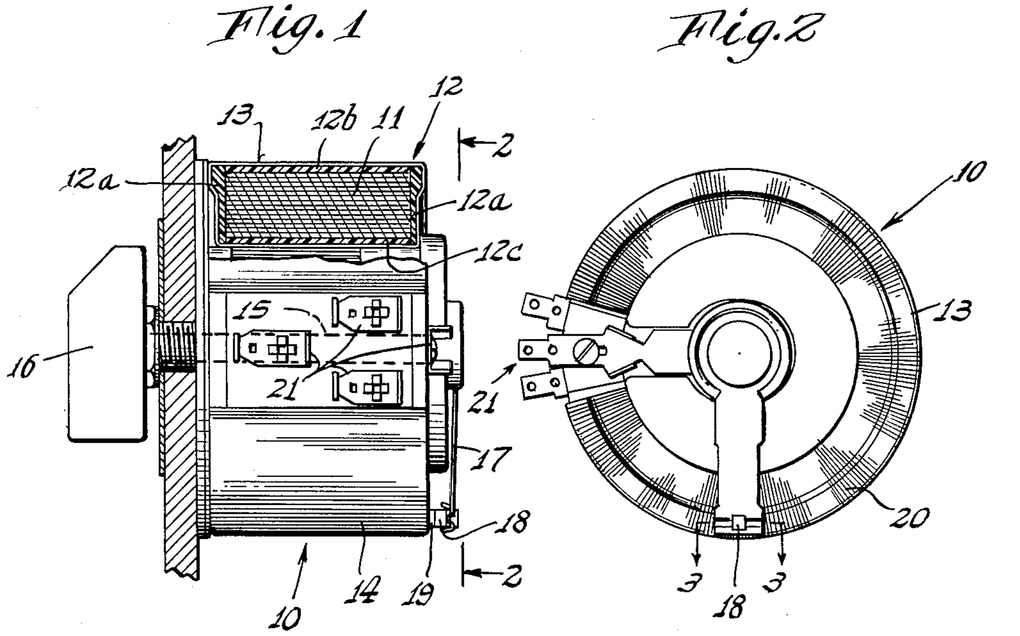
FIGURE 1 is a side view of an adjustable voltage autotransformer in which the present invention is incorporated shown partly in section.
FIG. 2 is an end view of the adjustable voltage autotransformer looking in the direction of the arrows 2—2 of FIG. 1.

Referring to the drawing, the reference numeral 10 generally indicates an adjustable voltage autotransformer in which the present invention has particular utility, the autotransformer having an annular laminated core 11 formed of paramagnetic material such as a length of iron sheet that is spirally wound to form the core.

Insulation 12, such as end caps 12*a* and exterior and interior cylindrical members 12*b* and 12*c* respectively enclose the core and a length of electrical conducting copper wire 13 is toroidally wound about the core insulation to form a single layer winding 14. A shaft 15 having at one end a manipulatable knob 16 extends through the center of the member 12*c* and operates by means of a conducting link 17, a brush 18 to cause rotational movement of the brush about the winding 14 upon movement of the knob. The brush has a carboniferous or graphitic portion 19 which engagingly rides on a commutating surface 20 formed on the turns of the outer layer of the winding. Because the autotransformer shown has only a single layer winding, substantially each turn thereof has a portion of the commutating surface formed thereon. Terminals 21 provide for external connections to the autotransformer.

It will be appreciated that the commutating surface 20 must be formed of a material that is electrically conducting since current therefrom passes to the brush 18 by the brush being spring urged into contact with and hence electrical engagement with the commutating surface.

It is therefore essential in order to have a satisfactory electrical apparatus that this surface be maintained electrically conducting and with a constant contact resistance between it and the brush 18 with the value of the contact resistance being determined and maintained at a desired value, as will be hereinafter apparent. Thus this surface must be smooth to prevent an abrasive action caused by the mechanical sliding movement of the spring urged brush to prevent wear between it and the brush. In addition the surface should be able to withstand humid salt atmosphere, sulphur vapor atmosphere and other industrial atmospheres which tend to affect the surface by causing pitting, corrosion and/or oxidation of the surface and thus altering the electrical characteristics thereof.

In achieving these results the wire 13 has a copper conducing portion 22 which in the specific embodiment shown is circular in cross-section. Surrounding the wire is a thin coating 23 of dielectric material or electric insulation which is adhered to the surface of the conductor portion 22. To provide an exposed portion of the conductor for electrical conduction therewith and also a flat surface thereof on which the brush may ride, a chordal segment is milled or otherwise removed from the wire to form an exposed copper surface 24.

In carrying out the present invention the exposed commutating portion of each of the turns of the copper conductor is coated with a relatively thin layer of ruthenium 25. This may be accomplished in the same manner that rhodium is plated onto the copper as by using well-known electroplating methods employing a ruthenium salt such as ruthenium chloride though other methods of mechanically securing the ruthenium layer or coating to the copper to have protection of the copper and electrical conductivity therebetween may be used. The thickness of the plating is substantially a matter of choice and may be in the neighborhood of 20 millionths of an inch to provide for a close grained, long lasting surface. The ruthenium coating 25 extends at least over the exposed copper surface 24 that are contacted by the brush, if not over the whole exposed copper surfaces.

Figures 3, 4:
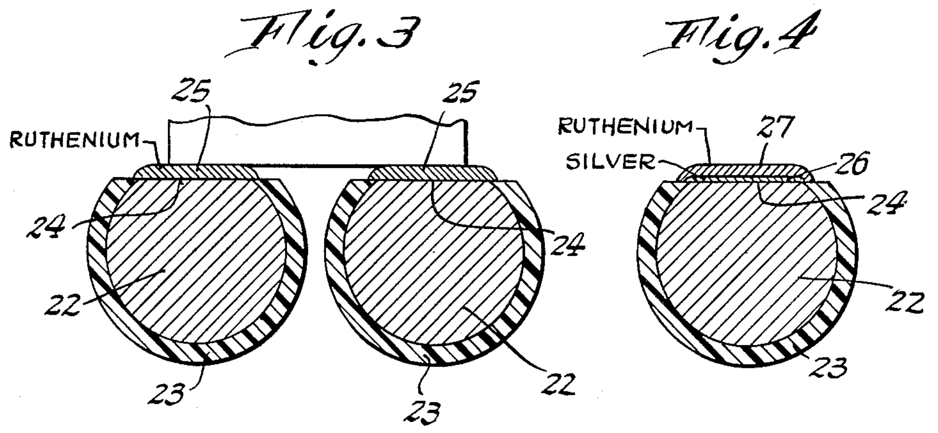
FIG. 3 is an enlarged cross-section of two adjacent turns of the winding with the brush thereon as taken on the line 3—3 of FIG. 2.
FIG. 4 is a section of the wire winding somewhat enlarged.

The use of ruthenium as a plating material of the commutating track of an adjustable voltage autotransformer formed of copper wire and having a carboniferous brush has particular advantages. In such an apparatus a circulating current is created when the brush bridges two adjacent turns, as shown in FIG. 3, with the current flowing from one conductor through the brush to its adjacent conductor and then through the length of wire connected therebetween. In order to limit the value of this current to a safe value the resistance between the carbon brush and the two surfaces and the resistance of the brush itself to conduction of electricity has to be selected so that the brush has a specific resistance both with respect to its contact resistance engagement and its own conductivity. These resistances have to be selected not only for no load conditions but also for full load resistance when load current passes through the brush to a load. The contact resistances and carboniferous brush naturally are resistances in the path of the load current and hence should be as small as possible. Thus these two conditions require the selection of a brush material which limits the turn-to-turn voltage to a safe value and yet does not insert too much resistance in the load circuit. To determine if the brush material selected qualifies for use the temperature of the brush under the two conditions is measured with a material being disqualified if the temperature of the brush exceeds a maximum value.

While heretofore it has been exceedingly difficult to select a brush material having the desired characteristics in view of the criticalness of the brush temperature during no load and full load conditions required to be less than a safe maximum value, with an adjustable voltage autotransformer having a ruthenium coating on the copper commutating surface contacted by the brush, a relatively wide range of resistances in the carbon brush material has been found to qualify. Thus, for example, with three different sizes of autotransformers which do not have a ruthenium coating, a different brush material is employed in each size thus requiring three different brush materials. In an autotransformer having a ruthenium plated commutating surface, any one of these three brush materials may be employed as the brush and still enable the autotransformer to be operated at the test conditions without the temperature of the brush exceeding the maximum limit.

A further advantage possessed by the ruthenium plating when particularly employed in an adjustable voltage autotransformer is that the temperature of the brush under no load and under full load conditions is substantially the same contrary to heretofore experience with plating materials other than ruthenium. This is a decided advantage in autotransformer construction since the brush resistance may be set such that the brush operating temperature may be maintained substantially constant throughout the value of the load.

It is presently unknown why ruthenium as a plating causes the above wanted advantages to occur, one theory being that any oxide or other salt formed with the ruthenium decomposers or melts at low temperatures. For example ruthenium tetroxide ($RuO_4$) melts at 25.5° C.

While the plating of the wire may be accomplished by electroplating with a ruthenium salt bath, ruthenium while more economical than rhodium is still somewhat expensive and accordingly to decrease the contamination of the ruthenium bath it may be found desirable to employ a base plate of a less precious material. Thus, for example as shown in FIG. 4, the copper surface 24 may first be coated with a silver layer 26 in any well-known manner and then the silver base plate be covered with the ruthenium layer 27.

It will accordingly be appreciated that there has been disclosed an electrical commutating surface formed on a copper wire which is corrosive resistant even in many corrosive industrial atmospheres, smooth and long wearing and forms a constant contact resistance with a carboniferous brush. These results have particular utility when the invention is employed on the commutating surface of an adjustable voltage autotransformer because of the minimizing of malfunctioning of the autotransformer by the brush temperature exceeding a maximum safe value even after long periods of use.

Variations and modifications may be made within the scope of the claims and portions of the improvements may be used without others.

I claim:

1. In an adjustable voltage autotransformer having a closed paramagnetic core, a length of electrical conducting wire wound on the core in inductive relation thereto and having a plurality of commutating turns on the core with each commutating turn having a portion that forms a planar commutating surface, said wire having an inner copper conductor and an exterior insulation covering the copper conductor but exposing the conductor at least at the portion of each commutating turn that forms the planar commutating surface, and a carboniferous brush movable along the planar commutating surface in electrical engagement with at least one of the commutating turns, the improvement comprising covering the exposed portions of the wire forming the commutating surface that is engageable with the brush with a layer of ruthenium with the said ruthenium layer being the final, exterior layer.

2. In an adjustable voltage autotransformer having a closed paramagnetic core, a length of electrical conducting wire wound on the core in inductive relation thereto and having a plurality of commutating turns on the core with each commutating turn having a portion that forms a planar commutating surface, said wire having an inner copper conductor and an exterior insulation covering the copper conductor but exposing the conductor at least at the portion of each commutating turn that forms the planar commutating surface, and a carboniferous brush movable along the planar commutating surface in electrical engagement with at least one of the commutating turns, the improvement comprising covering the exposed portions of the wire forming the commutating surface that is engageable with the brush with a layer of silver and covering the portions of the silver layer that are contactable by the brush with a layer of ruthenium to have electric current conducted between the copper conductor and the brush through the silver and ruthenium layers with the said ruthenium layer being the final, exterior layer.

References Cited by the Examiner

UNITED STATES PATENTS

| | | | |
|---|---|---|---|
| 2,253,672 | 8/41 | Wolter | 200—166 |
| 2,787,688 | 4/57 | Hall | 200—166 |
| 2,897,584 | 8/59 | Schumpelt | 200—166 |
| 2,949,592 | 9/60 | Smiley | 336—149 |

JOHN F. BURNS, *Primary Examiner.*

ORIS L. RADER, *Examiner.*